United States Patent Office 3,009,953
Patented Nov. 21, 1961

3,009,953
MANUFACTURE OF TRIMELLITIC ACID
Peter Stanley Backlund, Anaheim, Calif., assignor to Union Oil Company of California, Los Angeles, Calif., a corporation of California
No Drawing. Filed Dec. 15, 1958, Ser. No. 780,263
10 Claims. (Cl. 260—524)

This invention relates to the manufacture of trimellitic acid, and in particular concerns an improved process for manufacturing trimellitic acid from pseudocumene.

The preparation of benzene carboxylic acids by the nitric acid oxidation of the corresponding alkylbenzenes is well known. However, as the number of alkyl groups of the alkylbenzenes is increased, it becomes more difficult to effect complete oxidation, and side reactions leading to the formation of undesirable materials, e.g., nitration products, become more prominent. Thus, while toluene is very readily oxidized to benzoic acid, the oxidation of the xylenes to phthalic acids is not so readily accomplished, and the oxidation of pseudocumene to trimellitic acid is even less satisfactory. In the latter instance, the techniques heretofore employed effect only about 70 percent conversion to the desired acid, and the product is characteristically contaminated with 15–20 percent of nitration products. Furthermore, even these mediocre results are attained only through the use of quite dilute nitric acid, so that the reaction system comprises large quantities of water which must be heated to the reaction temperature, thereby consuming relatively large quantities of heat.

It is accordingly an object of the present invention to provide an improved method for preparing trimellitic acid from pseudocumene.

Another object is to provide a method whereby, in the nitric acid oxidation of pseudocumene to form trimellitic acid, the yield of the latter is improved and the formation of nitration products is minimized.

Other and related objects will be apparent from the following detailed description of the invention, and various advantages not specifically referred to herein will be apparent to those skilled in the art upon employing the invention in practice.

I have now found that the foregoing objects and their attendant advantages may be realized in a process in which pseudocumene is reacted with dilute nitric acid which is formed in situ, so to speak, by introducing concentrated nitric acid into a mixture of pseudocumene and water. More particularly, I have found that improved results in the way of increased yields of trimellitic acid and decreased yields of nitration products can be attained by heating a mixture of pseudocumene and water to the desired reaction temperature and thereafter continuously or incrementally introducing concentrated nitric acid into the heated mixture as the reaction progresses. Such procedure has a further advantage in that the concentration of the acid in the reaction system may be as high as about 60 percent. I have also found that further advantages lie in gradually increasing the reaction temperature as the reaction progresses, and in carrying out the reaction at reflux pressure. In its simplest embodiment, however, the process of the invention consists in forming a mixture of pseudocumene and water and gradually adding concentrated nitric acid thereto while maintaining the reaction mixture in the liquid phase at an elevated reaction temperature.

Considering now the process of the invention in greater detail, the nitric acid which is added to the pseudocumene-water mixture has a concentration ranging from about 65 to 100, preferably from about 70 to about 80 percent, by weight. Between about 5 and about 12, preferably between about 7 and about 8 moles of nitric acid (anhydrous basis) are employed per mole of pseudocumene. In forming the initial mixture of pseudocumene and water, the latter is employed in an amount equivalent to that required to dilute all of the nitric acid to a concentration between about 10 and about 60, preferably between about 20 and about 50, weight percent. The reaction is carried out at a temperature between about 150° C. and about 250° C., preferably between about 180° C. and about 220° C., and under a pressure at least sufficient to maintain the reactants in the liquid phase. The time required for completion of the reaction varies with the reaction temperature, but is usually between about 1 and about 4 hours.

Procedure-wise, any of several alternative modes of operation may be followed. According to one of such modes, the pseudocumene and water are charged to a pressure vessel fitted with an internal agitator, and the mixture is then heated to the desired reaction temperature under sufficient pressure to maintain the water in the liquid phase. The entire quantity of concentrated nitric acid is then continuously pumped into the vessel under the ambient pressure at a substantially uniform rate such that from about 0.5 to about 2.5 hours are required for addition of the acid. When all of the acid has been added, heating and stirring of the reaction mixture is usually continued for a short period of time, usually about 0.5 hour, to insure completion of the reaction, after which the reaction product is cooled and treated to recover the trimellitic acid product therefrom. Usually, it is desirable to remove part of the water from the reaction product by releasing the pressure thereon and flashing off water in vapor form. The product is then cooled to, say, 60°–95° C. and is filtered to remove any solids which are thereby precipitated. The filtrate is then further cooled to permit the trimellitic acid to crystallize in substantially pure form. Any of the other conventional methods of working up the reaction product may be employed if desired.

According to an alternative mode of operation, the nitric acid is introduced into the reaction vessel in relatively small increments which are pumped into the vessel at a more or less uniform rate.

According to a third, and preferred, mode of operation, the introduction of the nitric acid into the reaction vessel is carried out in two separate stages. In the first of said stages, between about 25 and about 75 percent of the total amount of acid employed is continuously pumped into the reaction vessel at a substantially uniform rate over a period of about 0.5 hour. Heating of the reaction mixture is then continued for about 0.5 hour without any further addition of acid, after which the remainder of the acid is added over a period of about 0.5 hour. Finally the reaction is completed by continuing the heating for a period of about 0.5 hour.

The following example illustrates the practice of the invention in its simplest embodiment, but is not to be construed as limiting the same. All proportions are given in parts by weight.

*Example I*

A mixture consisting of 121 parts of pseudocumene and 1582 parts of water is placed in an autoclave equipped with an internal agitator, and is pressured up to 150 p.s.i.g. with nitrogen. The mixture is then heated to about 200° C., and 454 parts of nitric acid in the form of a 72 percent by weight aqueous solution are forced into the vessel at a rate of about 15 parts per minute while maintaining the reaction mixture at the aforesaid temperature. The addition of acid thus requires about 30 minutes. Heating at 200° C. is continued for an additional 30 minute period, after which the vessel is vented, and the reaction product is worked up in the conventional manner. The yield of trimellitic acid is 82.2 mol precent, and the product contains 13.4 percent by weight nitrated materials. The amount of water employed in preparing the pseudocumene-water mixture corresponds to about 3.48 parts per part of anhydrous nitric acid. In addition, the nitric acid solution itself contains about 0.37 part of water per part of anhydrous nitric acid, so that the total amount of added water is about 3.85 part per part of anhydrous nitric acid. The overall average concentration of nitric acid in the system is thus about 20% by weight. When the reaction is carried out simply by adding 20 percent aqueous nitric acid to the pseudocumene and heating the mixture under the same conditions, the yield of trimellitic acid is only about 76 percent.

As previously stated, I have found it advantageous to increase the temperature as the reaction progresses. Such increase may be effected progressively throughout the entire course of the reaction, e.g., the temperature may be raised at a uniform rate from say, 160° C. to 220° C. over the entire course of the reaction, or the temperature may be raised in two or more definite steps. According to a preferred mode of operation, the temperature is held at the desired initial value, e.g., 150°–200° C., until about one-half of the nitric acid has been introduced, i.e., for about 0.25 to about 1.25 hours, and is then raised to a somewhat higher value, e.g., 200°–250° C., while the remainder of the acid is being added and for any additional reaction period after addition of the acid. The following example illustrates the effect of increasing the temperature in this manner:

*Example II*

A mixture of 242 parts of pseudocumene and 940 parts of water is introduced into the autoclave and pressured to 150 p.s.i.g. with nitrogen. The mixture is then heated to 205° C., and 882 parts of nitric acid in the form of a 72.5 percent aqueous solution are introduced into the autoclave at a uniform rate over a period of about 30 minutes. Heating at 205° C. is continued for an additional 30 minutes, after which the reaction product is worked up in the usual manner. The yield of trimellitic acid is about 85 mol percent. The run is then repeated with the following exceptions: The mixture of pseudocumene and water is heated to 160° C., which temperature is maintained while one-half of the concentrated nitric acid is added over a period of 15 minutes. The temperature is then held at 160° C. for an additional 15 minutes without further addition of acid. The remainder of the acid is then added over a 15 minute period during which the temperature is increased to 205° C. Finally, the reaction mixture is held at 205° C. for 30 minutes, after which the product is worked up in the usual manner. The yield of trimellitic acid is about 93 mol percent.

In the foregoing Example II, the overall average nitric acid concentration is about 40 percent. When 40 percent nitric acid is reacted directly with pseudocumene under comparable conditions, the yield of trimellitic acid is only about 60 percent.

I have further discovered that a substantial reduction in the amount of nitric acid consumed in the reaction can be achieved by operating under reflux conditions so that normally gaseous by-products (principally nitric oxide) are removed from the sphere of reaction as soon as they are formed. Conveniently, this type of operation is carried out by fitting the reaction vessel with a reflux condenser which is vented to the atmosphere through an adjustable relief valve. The valve is initially set to open at a value above the reflux pressure at the desired reaction temperature, and once the reaction has commenced the valve setting is adjusted downward until refluxing occurs. The following example illustrates the improvement attained by such procedure.

*Example III*

A mixture of 121 parts of pseudocumene and 1785 parts of water is introduced into an autoclave fitted with a water-cooled reflux condenser which discharges through a pressure relief valve into a gas collection vessel maintained at atmospheric pressure. The pressure relief valve is initially set to open at about 250 p.s.i.g. The autoclave is pressured to 150 p.s.i.g. with nitrogen, and the pseudocumene-water mixture is heated to 160° C. Approximately 372 parts of nitric acid in the form of a 72.5 percent aqueous nitric acid are then introduced into the autoclave at a rate of about 12.5 parts per minute. After the nitric acid has been added, heating at 160° C. and at reflux pressure is continued for 30 minutes, after which the temperature is raised to about 215° C. while introducing 123 parts of nitric acid in the form of the aforesaid aqueous solution and at the aforesaid rate. Simultaneously, the pressure relief valve is set to open at about 325 p.s.i.g. Finally, the reaction mixture is heated for an additional 30 minutes at 215° C. and 325 p.s.i.g. At no time does any refluxing take place in the condenser. The yield of trimellitic acid is about 86%, with about 1.27 lb. of nitric acid (anhydrous basis) being consumed per lb. of trimellitic acid produced. The procedure is then repeated except that as the acid is started into the autoclave the setting on the pressure relief valve is lowered to about 85 p.s.i.g. where refluxing occurs. When the temperature is raised and the second increment of acid is started into the autoclave, the valve setting is raised accordingly. The yield of trimellitic acid is about 89.7 percent, with only about 0.46 lb. of acid being consumed per lb. of trimellitic acid produced.

The following example illustrates the application of all of the foregoing techniques to the process of the invention, and represents a preferred mode of operation:

*Example IV*

A mixture of 242 parts of pseudocumene and 503 parts of water is charged to an autoclave fitted with a reflux condenser and pressure relief valve as described previously. Air is swept from the autoclave with a stream of nitrogen, whereupon the vessel is closed and pressured up to 100 p.s.i.g. with nitrogen. The pseudocumene-water mixture is heated to 160° C., and refluxing is started by setting the pressure relief valve to open at about 100 p.s.i.g. Approximately 442 parts of nitric acid in the form of a 72.5 percent aqueous solution are then pumped into the vessel over a period of 30 minutes, after which heating is continued at 160° C. under 100 p.s.i.g. for about 30 minutes. The temperature is then raised to 205° C. over a period of about 30 minutes while another 442 parts of acid are pumped into the vessel. The pressure relief valve is re-set to maintain refluxing conditions, and heating is continued at 205° C. for 30 minutes. The vessel is then vented, and the reaction product is cooled and worked up in the usual manner. The yield of trimellitic acid is 89.5 percent. Approximately 0.65 lb. of nitric acid (anhydrous basis) is consumed per lb. of trimellitic acid produced. The overall average concentration of the nitric acid introduced into the system was about 50 percent. When 50 percent acid is reacted directly with pseudocumene, the yield of trimellitic acid is only about 30 percent.

Other modes of applying the principle of my invention may be employed instead of those explained, change being made as regards the methods or materials employed, provided the step or steps stated by any of the following claims, or the equivalent of stated step or steps, be employed.

I, therefore, particularly point out and distinctly claim as my invention:

1. The process for preparing trimellitic acid which comprises forming a mixture of pseudocumene and water; heating said mixture to a temperature between about 150°

C. and 250° C. under sufficient pressure to maintain said mixture in the liquid phase; and introducing nitric acid into said mixture at a substantially uniform rate over a period of time between about 0.5 and about 2.5 hours while maintaining a reaction temperature between about 150° C. and 250° C. and a reaction pressure at least sufficient to maintain the reaction mixture in the liquid phase, said nitric acid having a concentration between about 65 and 100 percent by weight and being employed in an amount corresponding to between about 5 and about 12 moles of anhydrous nitric acid per mole of pseudocumene, and said water being employed in an amount corresponding to that required to dilute all of the nitric acid employed to a concentration between about 10 and about 60 percent by weight.

2. A process as defined by claim 1 wherein the nitric acid has a concentration between about 70 and about 80 percent by weight, said nitric acid is employed in an amount corresponding to between about 7 and about 8 moles of anhydrous nitric acid per mole of pseudocumene, and the water is employed in an amount corresponding to that required to dilute all of said nitric acid to a concentration between about 20 and about 50 percent by weight.

3. A process as defined by claim 1 in combination with the step of heating the reaction mixture at said reaction temperature and pressure for about 0.5 hour after completion of said introduction of nitric acid.

4. A process as defined by claim 1 wherein between about 25 and about 75 percent of the nitric acid is introduced over a period of about 0.5 hour, the reaction mixture is then maintained at said reaction temperature and pressure for about 0.5 hour, the remainder of the nitric acid is introduced over a period of about 0.5 hour, and the reaction mixture is then maintained at said reaction temperature and pressure for about 0.5 hour.

5. A process as defined by claim 1 wherein said reaction mixture is maintained under refluxing pressure.

6. A process as defined by claim 1 wherein, during said introduction of nitric acid, the said reaction temperature is raised from a low value within the stated range to a higher value within said range.

7. The process for preparing trimellitic acid which comprises forming a mixture of pseudocumene and water; heating said mixture to a temperature between about 150° C. and about 200° C. under sufficient pressure to maintain said mixture in the liquid phase; introducing a first portion of nitric acid of between about 65 and 100 percent by weight concentration into said heated mixture of pseudocumene and water at a substantially uniform rate over a period of between about 0.25 and about 1.25 hours while maintaining a reaction temperature between about 150° C. and about 200° C. and a reaction pressure such that the reaction mixture refluxes, the amount of said first portion of nitric acid corresponding to between about 2.5 and about 6 moles of anhydrous nitric acid per mole of pseudocumene; upon completion of said introduction of acid maintaining the reaction mixture at said reaction temperature and pressure for a period of about 0.25 hour; then raising the temperature of the reaction mixture to a value between about 200° C. and about 250° C.; introducing a second portion of nitric acid of the aforesaid concentration into the reaction mixture at a substantially uniform rate over a period of between about 0.25 and about 1.25 hours while maintaining a reaction temperature between about 200° C. and about 250° C. and a reaction pressure such that the reaction mixture refluxes, the amount of said second portion of nitric acid corresponding to between about 2.5 and about 6 moles of anhydrous nitric acid per mole of pseudocumene; and thereafter heating the reaction mixture for a period of about 0.5 hour; the amount of water employed in forming said mixture of pseudocumene and water corresponding to the amount required to dilute all of the nitric acid employed to a concentration between about 10 and about 60 percent by weight.

8. A process as defined by claim 7 wherein the nitric acid employed has a concentration between about 70 and about 80 percent by weight, and said first and second portions of nitric acid each corresponds to between about 3.5 and about 4 moles of anhydrous nitric acid per mole of pseudocumene.

9. A process as defined by claim 7 wherein the amount of water employed in forming said mixture of pseudocumene and water corresponds to the amount required to dilute all of the nitric acid employed to a concentration between about 20 and about 50 percent by weight.

10. The process for preparing trimellitic acid which comprises forming a mixture of pseudocumene and water; heating said mixture to a temperature between about 150° C. and about 200° C. under sufficient pressure to maintain said mixture in the liquid phase; introducing nitric acid into said mixture at a substantially uniform rate over a period of time between about 0.5 and about 2.5 hours, said nitric acid having a concentration between 65 and 100 percent by weight and being employed in an amount corresponding to between about 5 and about 12 moles of anhydrous nitric acid per mole of pseudocumene; during said introduction of nitric acid raising the temperature of the reaction mixture from a low value within the range of between about 150° C. and about 250° C. to a high value within said range while maintaining a reaction pressure such that the reaction mixture refluxes; thereafter reducing the reaction pressure and flashing water from the reaction product; and recovering trimellitic acid from the reaction product so obtained; the amount of water employed in forming said mixture of pseudocumene and water corresponding to the amount required to dilute all of the nitric acid employed to a concentration between about 20 and about 50 percent by weight.

References Cited in the file of this patent
UNITED STATES PATENTS 2,766,281     Zienty et al. _____ Oct. 9, 1956

FOREIGN PATENTS 758,676     Great Britain _____ Oct. 10, 1956

OTHER REFERENCES

Nazarov et al.: Chem. Absts., vol. 50, col. 251 (1956).